United States Patent Office 2,805,961
Patented Sept. 10, 1957

2,805,961

WATER-REPELLENT AEROGELS

Ira E. Puddington and Aurelio F. Sirianni, Ottawa, Ontario, Canada, assignors to National Research Council, Ottawa, Ontario, Canada, a body corporate of Canada No Drawing. Application March 5, 1952,
Serial No. 275,016

10 Claims. (Cl. 117—100)

This invention relates to the production of water-repellent aerogels.

This application is a continuation-in-part of our co-pending application, Serial Number 221,316, filed April 16, 1951, now abandoned.

As disclosed by Kistler, reference U. S. Patent No. 2,093,454, a dried gel may be produced, one continuous phase of which is a gas, which is now commonly known in the art as an aerogel. Heretofore a dried gel was produced generally by the precipitation of a colloidal solution, the precipitate containing within itself large quantities of the solvent or liquid menstruum yet presenting an aspect of rigidity and with the appearance, even microscopically, of homogeneity. The gel was subsequently dried.

The customary dried gel used in commerce was the silica gel, formed by the interaction of a solution of water glass with an acid, the combination resulting in the formation, after standing, of a rigid gel. On being broken up, thoroughly washed to remove salts and dried, the gel shrunk considerably. When completely dry it presented a hard glassy mass which was characterized by the fact that subsequent wetting and drying in the same menstruum did not affect in any substantial manner the physical characteristics of the original product. The valuable feature of the dried gel lay, of course, in the production of a mass which possessed up to 50% voids by volume and which, in some instances and depending on various treatments in the manufacture thereof, possessed even higher voids. But the tendency of the silica and other gels to shrink sizably on drying prevented largely the use and advantages of such dried materials with their enormous internal surfaces.

A study of the drying operation suggested theoretically that the gel formed was a mass of interlacing fibres, that on removal of the liquid menstruum by drying the liquid withdrew into and between the mass of submicroscopic fibres, where, aided by capillary attraction, its surface exerted tension upon the minute fibrils so that not only a loss of the water alone took place but a shrinkage of the entire mass.

It was apparent, therefore, that if the above drying process could be controlled, or in some way circumvented altogether it might be possible to produce a dried gel which would yield an entirely new class of colloidal products of an essentially amorphous character in which the voids between the minute individual particles or fibres were substantially of the same character and size as within the undried gel in its original state.

By the aforementioned disclosure, U. S. Patent No. 2,093,454, and in subsequent U. S. patents numbered 2,188,007 and 2,249,767, Kistler made known a method whereby he produced gels with void-space ranging up to 99% by volume and even higher. To distinguish between the gels heretofore described he named these aerogels.

However, the aerogels produced in the past, such as those described in the afore-mentioned Kistler patents, suffer from the physical characteristic that they are affected by water and humidity with the undesirable feature that they subsequently shrink on drying out—either partially or completely depending on the amount of liquid absorbed or adsorbed—to leave an amorphous product of less value in commerce than that of the original dried aerogel. Further, the use of such aerogels as carriers for catalysts are seriously affected in these types of reactions, particularly in gaseous chemical reactions where condensed water is present, thus tending to balance out and nullify the original economic advantage of the aerogel. Also, these types of aerogels cannot be used satisfactorily as a final and beneficial product in those instances where water is met with or may be met with in a liquid or vaporous form, such as fillers in life preservers, smoke and gas masks employed in fighting fires, heat insulating material in exposed conditions, etc. Further these products do not provide the most favourable results when used as oil thickeners in greases and other lubricants.

It is a primary object of the present invention, therefore, to produce an aerogel by a method over which complete control may be exercised at all phases yet at the same time providing a product having water-repellent characteristics.

It is a further object to produce an aerogel which, when water is added thereto, does not substantially shrink on drying.

It is an additional object to provide a product which, in itself is of commercial value, with an extremely high volume to weight ratio, and which is substantially impervious to humidity.

It is a further object to provide a water-repellent aerogel in an economical and simple manner.

It is a still further object of this invention to provide a water-repellent aerogel which may be used as an additive product in the manufacture of greases, paints, anti-caking agents, printing inks, varnishes, lacquers, rubber, and the like.

Without limiting the objects aforesaid in any way, the manufacture of a typical water-repellent aerogel which may be used to illustrate by way of example only the application of the principles of this invention, is that made from silica and which, in the following paragraphs, first generally discloses, and then later in detail, embodiments of our invention:

In the manner of Kistler, we first form a silica hydrogel in a water medium. The gel so formed is washed free of soluble substances left by the interaction. We then displace the aqueous menstruum by shaking or extracting the gel repeatedly with a solvent miscible in the water medium but which has a critical temperature lower than that of water and a less solvent action than water. These extracting liquids may be of various kinds such as the lower alkyl ketones, lower alkyl alcohols, lower alkyl fatty acids and their anhydrides. The ketones, methyl, ethyl and propyl alcohols, for example, are entirely suitable. The liquids, of course, must reasonably dissolve the resins or resin forming materials which are added, as will be explained. In the main, acetone is preferred. To the now water-free gel, its menstruum effectively and substantially consisting of one of the above solvents, are added water-repelling agents which themselves are soluble in the displacing liquid that was used. These agents we have found may comprise substantially equivalent portions of polyhydric alcohols or modified alcohols (e. g. glycerol, glycol, glycerol-monostearate and the like) used in conjunction with polycarboxylic acids (e. g. phthalic, succinic, malic, citric and the like). Further, additional alcohols useful in this invention may comprise ethylene glycol, butanediol, ethylidene glycol, mesitylene glycol, propylene-propanediol, pinacone, tetraphenyl-benzopinacol, and sugars such as the pentoses, hexoses and glucoses;

also erythiritol and sorbitol. The equivalent anhydrides or condensation products of these bases and acids may also be used.

Experiment has shown that a variety of other materials which are soluble in the last displacing solvent may also be used, all of which set up some degree of water-repellency on the surfaces of the aerogel. Such substances are, e. g., aminosilanes, for instance, methyl aminosilane, butyl-aminosilane, polystyrene, siloxanes and derivatives of these and the like.

In addition, we have found that there exist a large number of other resinous forming compositions, for example, drying oils (such as linseed oil, tung oil, dehydrated castor oil and soya oil); natural resins (such as shellac, copal [manilla], damar, polyterpene, Canada balsam); synthetic resins (cellulosics, alkyds, ester gum, phenol formaldehyde, [Epon] epichlorhydrin, bisphenol, coumarone indene); and cellulose derivatives (such as cellulose acetate, cellulose acetate-butyrate, ethyl cellulose, benzyl cellulose) which provide satisfactory water-repellent characteristics to the resulting aerogels.

We have found that the amount of water-repelling agents required to be added to the moist gel may vary over a wide range and yet produce varying degrees of efficient water-proofing, i. e. 10% to 100% by weight of the dry weight of the gel. The water-repelling agents of course are added always to the last solvent used in the displacing process. From this stage we again resume after the manner of Kistler by transferring the moist mass—now a composite of gel, solvent and water-repellent agent or constituent thereof—to an autoclave wherein it is heated under pressure, as hereinbefore described, to a temperature exceeding the critical temperature of the solvent or liquid phase used as a displacing medium. The vapour is then permitted to escape slowly to prevent disruption of the gel whereupon air or other gas is permitted entrance to the pressure vessel. The dried aerogel remaining is a product with essentially the same physical properties as those made known by Kistler with the added important characteristic of being substantially repellent to water.

A detailed description of the method used to prepare the silica acetone gel is as follows:

To 200 gms. sodium silicate made up to 900 cc. with distilled water, 29 grams of 95% $H_2SO_4$ in 1100 cc. of distilled water were added. This produced a dispersion of silicic acid with a pH of 6.5. Other experiments showed that equivalent acids such as phosphoric, acetic, hydrochloric, etc. were equally satisfactory, and final pH values between 5 and 9 could be used successfully.

After aging for 24 hours the gel formed above was agitated with 1 litre of distilled water until a smooth paste was formed, it was then filtered. This treatment was repeated to a total of four washings which substantially removed water soluble inorganic salts. Following this, the washed silica was suspended in one litre of acetone or alcohol and filtered. The silica now wet with a mixture of water and acetone or alcohol was placed in a porous container which was in turn placed in a continuous liquid extractor and extracted with acetone or alcohol. Solid calcium chloride in the receiver, and a packed column placed in front of the condenser gave a continuous supply of substantially anhydrous liquid to the silica. The extraction was continued until all the water was removed from the silica and replaced with acetone. The silica was considered to be water free when a few grams of acetone-gel placed in 300 viscosity hydrocarbon oil showed no sign of shrinking when the acetone was flashed off at 125° C. The continuous extraction normally lasted about 24 hours.

Various quantities of the silica alcogel or acetonegel which contained about 7.5% of silica by weight were made up to one litre with the appropriate liquid (alcohol or acetone). Into this dispersion was mixed the ingredients of, or the finished waterproofing resin. (The exact amounts are shown in subsequent specific examples.) The whole dispersion containing silica, solvent, and waterproofing resin or resin ingredients was then transferred to a glass cylinder of 6.4 cm. O. D., which in turn was placed in a stainless steel autoclave.

The autoclave was then placed in a cylindrical electric furnace and heated. After about 25–50 cc. of alcohol had been distilled off indicating removal of the air, the autoclave was closed and heating continued. The pressure inside the vessel was not allowed to exceed 1600 p. s. i. This was controlled by opening the manually operated valve slightly. When a temperature about 10–15° C. higher than the critical temperature of the liquid was reached the valve was released and the vapour passed through a condenser for collection for subsequent use. The autoclave was then placed in a cooling container. After reaching room temperature any excess of solvent vapour is pumped off and air admitted to the autoclave.

The bulk density of the samples prepared by this method varied between 0.08 and 0.18 gm./cc. The density depends chiefly on how thoroughly the water has been removed during solvent exchanging, and to a lesser extent on the concentrations of silica in the original gel, and the thoroughness with which the solvent is removed after autoclaving.

For testing the water-repellency of the dried aerogels so produced the following method was used and followed with all examples illustrated hereafter:

10% by weight of the solid dried water-repellent aerogel was dispersed in hydrocarbon oil of 300 SUS at 100° F. viscosity by passage through a colloid mill which provided a grease of good structure. A grease worker of 50 cc. capacity (6" in length, 1" in diameter, with piston having a single orifice 1/32" in diameter) was the testing instrument. About 5 gms. of grease with dried aerogel content was worked in each case with 40 cc. water at 70° C., the piston being operated manually in a vertical direction forcing all the water and dispersed aerogel through the orifice of the piston twice for each complete cycle or stroke of the piston. For example, 150 cycles of the piston resulted in 300 separate passages through the orifice. The degree of water-proofing of the aerogel is judged from the number of cycles of the piston required before the gel-oil dispersion disintegrates.

References in the following examples to "strokes" or "cycles" of the grease testing instrument indicate, therefore, the water-proofing, water-repellency, or water-resistance of the dried aerogel according to the invention and are a measure thereof.

ALCOGEL EXAMPLES

*Example 1*

Silica alcogel _____ 400 gms. containing 7.5% solids.
Citric acid _____ 8 gms.
Glyceryl
  monoricinoleate ____ 40 gms.
Autoclaved at 260° C.
Yield 50 gms. of aerogel of density 0.12 gm./cc.
Water resistance—more than 150 strokes.

*Example 2*

Silica alcogel _____ 300 gms. containing 7.5% solids.
Tetrachlorophthalic
  anhydride _____ 13.5 gms.
Glyceryl
  monoricinoleate ____ 30 gms.
Autoclaved at 250° C.
Yield 40 gms. of aerogel of density 0.08 gm./cc.
Water resistance—more than 150 strokes.

Example 3

Silica alcogel _____ 300 gms. containing 7.5% solids.
Maleic anhydride _____ 9 gms.
Glyceryl monooleate ___ 30 gms.
Autoclaved at 260° C.
Yield 43 gms. of aerogel of density 0.10 gm./cc.
Water resistance—more than 180 strokes.

Example 4

Silica alcogel _____ 300 gms. containing 7.5% solids.
Glycerine _____ 7.6 gms.
Oleic acid _____ 23.6 gms.
Autoclaved at 260° C.
Yield 41 gms. of aerogel of density 0.15 gm./cc.
Water resistance—more than 150 strokes.

EXAMPLES OF ACETONE GELS (I. E. USING ACETONE AS SOLVENT)

(The production of acetone gels was in fact preferred to that of the alcogels in order to reduce alcoholysis of the resin, although the procedure in each case was the same.)

Example 5

Silica acetone gel _____ 200 gms. containing 7.5% solids.
Monostyrene _____ 100 gms.
Benzoyl peroxide _____ 0.4 gm.
Autoclaved at 250° C.
Yield 20 gms. of aerogel of density 0.06 gm./cc.
Water resistance—more than 15 strokes.

Example 6

Silica acetone gel _____ 400 gms. containing 7.5% solids.
Citric acid _____ 6.0 gms.
Glyceryl monoricinoleate ____ 30 gms.
Autoclaved at 250° C.
Yield 50 gms. of aerogel of density 0.08 gm./cc.
Water resistance—more than 150 strokes.

Example 7

Silica acetone gel _____ 400 gms. containing 7.5% solids.
Maleic anhydride _____ 12 gms.
Glyceryl monooleate ___ 40 gms.
Autoclaved at 250° C.
Yield 55 gms. of aerogel of density 0.14 gm./cc.
Water resistance—more than 150 strokes.

Example 8

Silica acetone gel _____ 250 gms. containing 7.5% solids.
Glyceryl monostearate _____ 20 gms.
Citric acid _____ 5 gms.
Autoclaved at 250° C.
Yield 35 gms. of aerogel of density 0.18 gm./cc.
Water resistance—More than 150 strokes.

Example 9

To 300 gms. of silica acetone gel containing 7.5% solids was added 25 gms. of a resin made by reacting maleic anhydride and glyceryl monoricinoleate in equimolecular proportions. This mix was autoclaved at 250° C. Water resistance—more than 150 strokes.

EXAMPLE OF ALUMINA AEROGEL (USING ACETONE AS SOLVENT)

Example 10

Alumina Al(OH)$_3$ was prepared by precipitating a solution of aluminium sulfate Al$_2$(SO$_4$)$_3$.18H$_2$O with ammonia (NH$_4$OH). The gelatinous precipitate was then washed with water and solvent exchanged with acetone until the normal water content of the alumina was substantially replaced by acetone.

Alumina acetone gel ____ 50 gms. containing 12% solids.
Glyceryl monoricinoleate _____ 2.65 gms.
Citric acid _____ 1.02 gms.
Autoclaved at 260° C.
Yield 8 gms. of aerogel of density 0.15 gm./cc.
Water resistance—10 strokes.

EXAMPLE OF CELLULOSE AEROGEL (USING ACETONE AS SOLVENT)

Example 11

Cellulose was regenerated by acidifying viscose solution with dilute sulfuric acid. After washing the cellulose with water it was solvent exchanged with acetone.

Aerogel was made as follows:

|  | Gms. |
|---|---|
| Cellulose acetone paste | 200 |
| Citric acid | 8 |
| Glyceryl monoricinoleate | 40 |

Autoclaved at 260° C.

The mixture was made up to 900 cc. with acetone and heated up to 260° C. The pressure was maintained at 1600 p. s. i. The acetone was released at 250° C.

The product was brown in colour and a solvent with a lower critical temperature than acetone would be more suitable.

The yield obtained was 37 grams with a bulk density of 0.249 gm./cc. It emulsified after 3 strokes were applied.

MISCELLANEOUS EXAMPLES

Example 12

3 gms. dried silica aerogel not treated in the above-described manner according to the invention (i. e., in the manner of Kistler). Water resistance—less than one stroke.

Example 13

Silica alcogel (equivalent to 3 gms. dried product) was treated in accordance with the method of the invention with—

0.59 gm. phthalic anhydride
0.37 gm. glycerol
1.13 gms. oleic acid

Water resistance—12 strokes.

Example 14

Silica alcogel (equivalent to 3 gms. dried product) was treated in accordance with the method of the invention with 0.5 gm. resin derived from a composition resulting from a mixture of phthalic anhydride, glycerol and oleic acid in equimolecular proportions. Water resistance—20 strokes.

Example 15

Silica alcogel (equivalent to 3 gms. dried product) was treated in accordance with the method of the invention with—

3.5 gms. glycerol monoricinoleate
1.2 gms. maleic acid

Water resistance—over 50 strokes.

Example 16

As in Example 14, using acetone as final displacing solvent, but with 2 gms. resin formed from the ingredients set forth in Example 15. Water resistance—over 150 strokes.

Example 17

As in Example 15, with 2 gms. of resin formed from the ingredients set forth. Water resistance—over 150 strokes.

Example 18

Silica acetone gel (equivalent to 4.3 gms. dried product) was treated in accordance with the method of the invention with—

2.6 gms. glycerol monoricinoleate
1.0 gm. citric acid

Water resistance—over 150 strokes.

Example 19

Silica acetone gel (equivalent to 6 gms. dried product) was treated in accordance with the method of the invention with—

3.54 gms. glycerol monoricinoleate
2.02 gms. sebacic acid

Water resistance—over 150 strokes.

Example 20

Silica acetone gel (equivalent to 4.2 gms. dried product) was treated in accordance with the method of the invention with—

3.5 gms. glycerol monoricinoleate
1.2 gms. succinic acid

Water resistance—over 150 strokes.

It should be pointed out that in the above examples acetone was used as the final displacing solvent in which the resins or their producing agents were dissolved. It is understood, of course, that any suitable solvent with low critical temperature may be used.

In addition to the liquids already mentioned which are useful in displacing water from the gels, other liquids such as ammonia, pyridine and lower mono-di and tertiary alkyl substituted amines have been found suitable.

With regard to the application of water-repellent characteristics to the silica gel when the agents used were various drying oils, natural resins, synthetic resins and cellulose derivatives, as hereinbefore mentioned, the procedure used was varied slightly for convenience. The silica acetone gel containing 4 grams of silica was mixed with an acetone or alcohol solution of each of these various materials in the amount as listed in the following table. The mixture was then placed in an autoclave and heated to 250° C. Small amounts of solvent were allowed to escape from time to time as the temperature was raised to keep the pressure just above the critical point without allowing large excess to build up. The pressure was held in the vicinity of 1400 p. s. i. After reaching the critical temperature, the solvent was allowed to escape completely. After the autoclave was cooled and evacuated, air was allowed to enter and the water-repellent aerogel that was formed during the process was removed.

The efficiency of the coating was tested by dispersing 3½ grams of the dried gel in 26½ grams of 300 S. U. S. oil at 100° F., and 95 V. I. Fifteen grams of this dispersion were placed in the cylindrical grease worker before described with 40 gms. of water at 70° C. and worked for 50 cycles of the piston. The water was replaced after each 50 cycles and the process continued up to 150 cycles or disintegration of the dispersion, whichever occurred first.

The following table indicates the interesting results obtained from this variety of agents. The coating materials used are set forth under four general classifications. Reference to "strokes" is a test of the water-repellency characterictics of the coated gels in that it indicates the number of cycles of the piston required before the gel disintegrates (although, as mentioned, the testing was not proceeded with past 150 cycles of the piston).

For comparative purposes, 3 gms. dried silica not treated in the above-described manner according to the invention (i. e. in the manner of Kistler), was again tested and disintegration occurred with less than one stroke of the piston.

TABLE OF RESULTS

| Coating Material | Classification | Amount of coating material used per 4 gms. silica (dispersed in silica acetone gel) Gms. | Strokes |
|---|---|---|---|
| boiled linseed oil | drying oil | 10 | 85 |
| tung oil | do | 10 | 150 |
| dehydrated castor oil | do | 10 | 150 |
| Soya bean oil | do | 10 | 5 |
| cellulose acetate-butyrate | cellulose derivative or synthetic resin | 10 | 150 |
| cellulose acetate | do | 8 | 35 |
| ethyl cellulose | do | 8 | 104 |
| benzyl cellulose | do | 8 | 150 |
| phenolic resin (Durez #12687) | synthetic resin | 10 | 150 |
| ester gum | do | 10 | 150 |
| Epon resin $1009 | do | 10 | 53 |
| cumar V½ | do | 10 | 4 |
| polyterpene | natural resin | 10 | 4 |
| gum dammar | do | 10 | 150 |
| gum copal (manilla) | do | 10 | 80 |
| Canada balsam | do | 10 | 150 |
| Congo resin | do | 10 | 103 |
| shellac | do | 10 | 35 |

In the foregoing table of results Durez #12687 refers to a condensation product of a phenol and a formaldehyde and is sold under this trade name by Durez Plastics and Chemicals Incorporated, North Tonawonda, New York; Cumar V½ refers to a polymer of coumarone and indene and is sold under this name by The Barrett Division Allied Chemical and Dye Corporation, New York.

Although 10 grams of resin were added in most of the above cases, this does not mean that the final product bears the ratio 10/4 coating material to silica. Most of these types of resins are appreciably volatile in the compressed solvent vapor and are carried over when the solvent is released. Normally the carry-over would be recovered and reused and does not represent a loss. In other instances low solubility of the resins in the solvents used prevent complete solution and subsequent coating of the silica. In these latter cases the aerogel is probably a mechanical mixture of coated silica and coating material.

It should be pointed out that in the above examples acetone was used as the final displacing solvent in which the resins or their producing agents were dissolved. It is understood, of course, that any suitable solvent with low critical temperature may be used. For instance, they can include gasolines, petroleum solvents, benzene and toluene. These latter are not, of course, soluble in water but could be used to replace another liquid in the gel if desired.

Also of interest is that finely divided silica may be coated with, e. g. styrene, butadiene and butyl methacrylate to render its surfaces hydrophobic.

Our improved method of aerogel manufacture which in particular relates to the production of water-repellent aerogels is generally applicable to gels whether inorganic or organic. We wish to emphasize that the above examples are illustrative only and that silica hydrogel used so frequently in the above examples is used as a basis merely as a matter of convenience and for purposes of standardizing our testing methods.

It will be apparent that an improved process of aerogel production has been provided which culminates in the production of a water-repellent product that is much desired in the art and whose features are indeed beneficial and requisite in many articles of commerce. Only the preferred features of this invention have been described but it will be apparent to those skilled in the art that many modifications herein may be made without departing from the scope, principle and spirit of the invention.

We claim:

1. A process for making a polyester resin coated inorganic aerogel comprising replacing the water in a precipitated inorganic gel with a water miscible organic solvent having a critical temperature less than water, dissolving in the mixture so formed the reaction product of a polycarboxylic acid and polyhydric alcohol, heating said mass under pressure to a temperature in excess of the critical temperature of the organic solvent, allowing the gasified organic solvent to escape thus producing an inorganic aerogel having the surface thereof coated with a continuous film of resin.

2. A process for making a coated aerogel comprising replacing the water in a precipitated gel with a water miscible organic solvent having a critical temperature less than water, mixing in the dispersion so formed a water repellent film forming composition comprising one of the group consisting of a reaction product of a polycarboxylic acid and a polyhydric alcohol, natural resins, aminosilanes, natural drying oils, cellulose ethers and esters, phenol aldehyde resins, coumarone indene resin, heating the mass under pressure to a temperature in excess of the critical temperature of the organic solvent, allowing the gasified organic solvent to escape thus producing an aerogel having the surface thereof coated with a water repellent film.

3. A process as described in claim 2 wherein the polyhydric alcohol is one of the group consisting of glyceryl monostearate, glyceryl monooleate and glyceryl monoricinoleate.

4. A process as described in claim 2 wherein the polycarboxylic acid is one of the group consisting of citric acid, tetrachlorophthalic acid, maleic acid, phthalic acid, hebacic acid and succinic acid.

5. A process as described in claim 2 wherein the solvent is one of the group consisting of lower alkyl alcohols and lower alkyl ketones.

6. A process as described in claim 2 wherein the film forming composition is a reaction product of a polycarboxylic acid and a polyhydric alcohol.

7. A process as described in claim 2 wherein the film forming composition is a natural resin.

8. A process as described in claim 2 wherein the film forming composition is a natural drying oil.

9. A process as described in claim 2 wherein the film forming composition is a cellulose ester.

10. A process as described in claim 2 wherein the film forming composition is a phenol aldehyde resin.

References Cited in the file of this patent

UNITED STATES PATENTS

| | | |
|---|---|---|
| 2,306,222 | Patnode | Dec. 22, 1942 |
| 2,412,470 | Norton | Dec. 10, 1946 |
| 2,444,752 | Siegler | July 6, 1948 |
| 2,474,704 | Thayer | June 28, 1949 |
| 2,479,836 | Hoback et al. | Aug. 23, 1949 |
| 2,567,315 | Bidaud et al. | Sept. 11, 1951 |
| 2,589,705 | Kistler | Mar. 18, 1952 |
| 2,625,512 | Powell | Jan. 13, 1953 |